No. 815,874. PATENTED MAR. 20, 1906.
M. STRANSKY.
STRAINER.
APPLICATION FILED JULY 28, 1905.
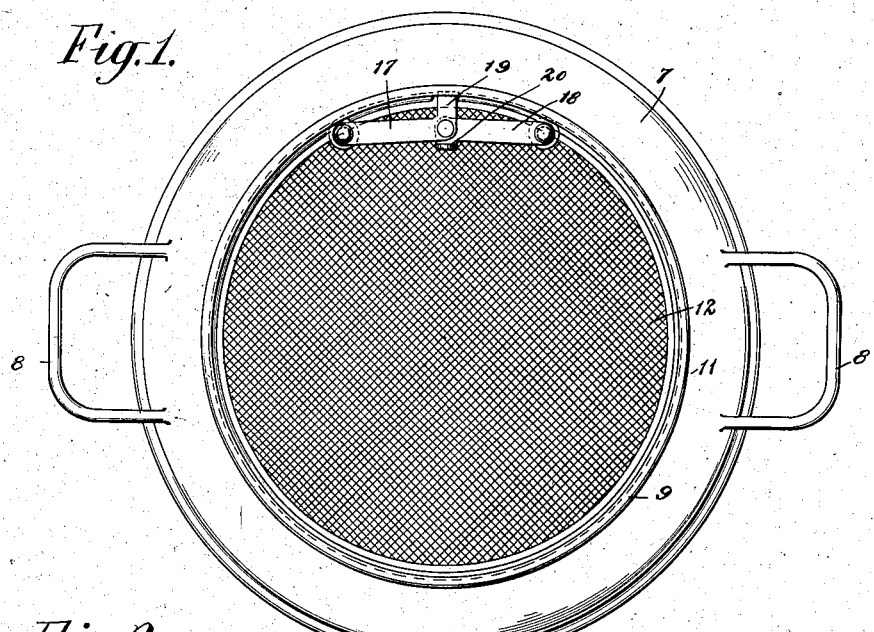
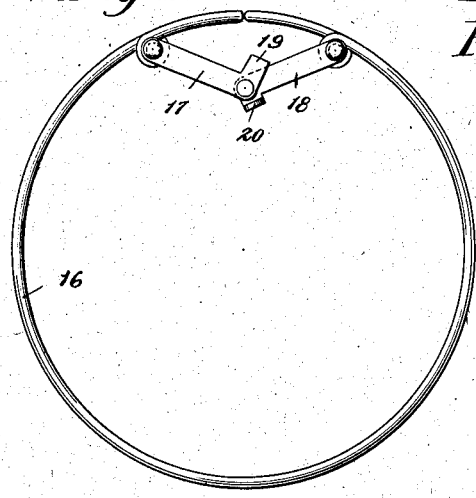
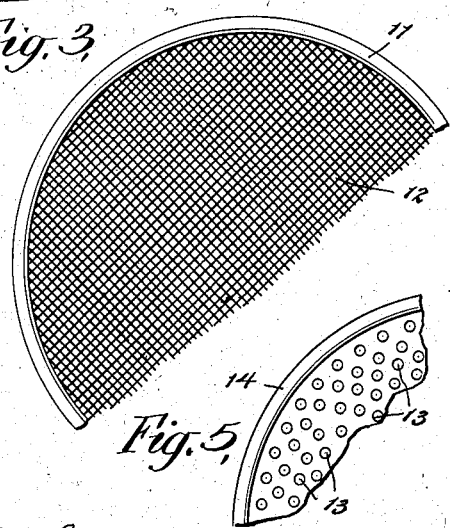
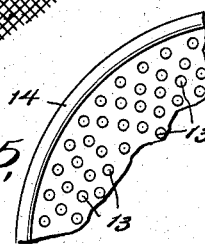
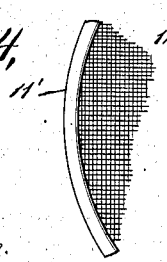
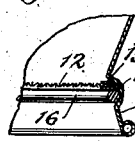
WITNESSES:
INVENTOR
Maurice Stransky
BY
ATTORNEY

UNITED STATES PATENT OFFICE.

MAURICE STRANSKY, OF NEW YORK, N. Y.

STRAINER.

No. 815,874.　　　　Specification of Letters Patent.　　　Patented March 20, 1906.

Application filed July 28, 1905. Serial No. 271,594.

*To all whom it may concern:*

Be it known that I, MAURICE STRANSKY, a citizen of the United States, residing at New York, in the county and State of New York, have invented certain new and useful Improvements in Strainers, of which the following is a specification.

This invention relates to filters or colanders, primarily for kitchen and other domestic uses, yet undoubtedly capable of adaptation to a wider range of usefulness.

The objects of the invention are, first, to provide a much more sanitary utensil of this class which may be more readily thoroughly cleaned or sterilized, if desired, and, secondly, to provide a strainer or filter in which the perforated or meshed portion is easily removable (to which the first-mentioned object is incidental) and with similar portions interchangeable, whereby a single device may serve a variety of purposes now requiring more or less of an assortment.

It is well known that strainers, particularly those designed for domestic uses, are thoroughly cleaned with difficulty. If the perforated or meshed portion, usually the bottom, is made removable, ready access may be had in cleaning to parts and crevices difficult to reach in an integral or substantially integral device of this character. Furthermore, a strainer embodying my invention permits of the employment of any one of a variety of separate perforated or meshed portions with assorted gage or sizes of perforations or interstices, which is of obvious economical advantage.

With the above and other ends in view my invention consists generally in a strainer having the percolator separate and removable and in novel means for detachably securing said percolator in place.

My invention further consists in a container or receptacle having an open bottom, a removable perforated or meshed disk having a seat in the opening, and means for detachably securing said disk within said opening and for subjecting said disk to constant pressure, tending to hold the same firmly against its seat.

My invention further consists in various details of construction and in combinations of parts, all as hereinafter described, and particularly pointed out in the claims.

My invention will be more readily understood by reference to the accompanying drawings, forming a part of this specification, and in which—

Figure 1 is a bottom plan view of a strainer embodying my invention. Fig. 2 is a view of the securing or locking ring. Fig. 3 is a view of the percolator or sieve. Figs. 4 and 5 illustrate modifications of the detachable percolator shown in Fig. 3. Fig. 6 is a detail of construction hereinafter described.

Referring now to the drawings in detail, numeral 7 refers to the body portion of a receptacle or container, which may be of any common or usual configuration, which I have shown provided with handles 8 8 and which has an open bottom. Surrounding this opening is an annular rim 9, which is (see Fig. 6) slightly converging and provided with an annular groove 10. My invention contemplates the employment with this body portion and rim of any desired form of perforated or meshed disk, such as shown in Fig. 3, wherein an annular frame 11 carries the wire net 12, or, as shown in Fig. 5, the disk may be made of sheet metal having any desired size of perforations 13 therein and preferably a curled or beaded edge 14. This disk is designed to be freely inserted into and removable from the rim 9, the groove 10 and the converging wall of which provide a shoulder or stop 15.

An open metallic ring 16 has a normal minimum diameter slightly less than the inside diameter of the rim 9 at the groove 10 and is therefore readily inserted within the groove 10. This ring 16 is formed of spring metal, yieldingly resisting expansion or the spreading apart of its ends. Near each end of said ring is pivoted an arm 17 and 18, respectively, which arms are themselves pivoted together to form an angle when the ends of said ring are in contact and said ring, therefore, of its least diameter. Obviously the exertion of a slight lateral pressure at the apex of this angle, tending to bring the two arms into alinement, will spread apart the ends of the ring against its spring action and enlarge or expand the circular area thereof. Therefore, if this ring is placed in the groove 10 with the disk between said ring and the shoulder 15 and expanded by bringing said arms 17 and 18 into alinement, said disk will be firmly and securely locked in place. Furthermore, it will be noted that the groove 10 is of a size to snugly accommodate the annular frame 11 and the ring 16. Therefore when said ring is expanded in said groove the curved or tapering walls of the latter will tend to compress the frame 11 between the ring 16 and the upper wall of the groove. In this manner I insure a perfectly tight joint by providing for the exertion of a constant pressure, tending to firmly hold said disk against its seat.

I have shown the arm 17 provided with a projection 19, the end of which is adapted to impinge against the rim 9 to stop movement of said arms when they have "passed the center," so that they may be locked against accidental contraction of said ring. The arm 18 may be provided with a lug or projection 20 to facilitate manipulation of the arms.

It will be apparent that when disk and ring are removed there remains only a substantially bowl-shaped container or vessel with an open bottom, every portion of which is easily accessible for purposes of cleaning. It will also be apparent that with an assortment of disks one utensil may be easily adapted to a widely-diversified range of usefulness.

Many modifications of the minor details of my improved strainer will doubtless readily suggest themselves to those skilled in the art to which it appertains, and I therefore do not desire to limit my invention to the specific construction herein shown and described.

Having thus described my invention, I claim as new and desire to secure by Letters Patent—

1. In combination, a vessel, a separate and removable bottom therefor, a suitable top on one side of said bottom, a ring on the other side thereof, and means for expanding said ring and retaining the same in its expanded condition.

2. In combination, a vessel having a bottom opening, an annular groove at said opening, a perforate bottom within and removable from said groove, a normally contracted, expansible ring which when expanded and with said bottom substantially fills said groove, and means for retaining said ring in its expanded condition.

3. In combination, a vessel having an open bottom, a rim at the opening, a perforate disk fitting within said rim, a stop on one side of said disk, an open ring on the other side thereof, and means for expanding and locking said ring.

4. In combination, a vessel having an open bottom, an outwardly-tapering rim at the opening, a perforate disk of slightly-greater diameter than the smallest diameter of said rim fitting within said rim, and a normally contracted, expansible ring to lock said disk in said rim.

5. In combination, a vessel having an open bottom, a rim at the opening, a circular groove in said rim, a perforate disk within and normally removable from said groove, an open ring with said disk substantially filling said groove, and means for expanding and locking said ring.

6. In combination, a vessel having an open bottom, an outwardly-tapering rim at the opening, a circular groove at the inner edge of said rim, a perforate disk within and removable from said groove, an open ring with said disk substantially filling said groove, and means for expanding and locking said ring.

In testimony of the foregoing I have hereunto set my hand in the presence of two witnesses.

MAURICE STRANSKY.

Witnesses:
A. H. THIELE,
HERMAN H. PRIMAVESE.